Dec. 8, 1936.  C. D. FATOR  2,063,032
SPEED CONTROL OF LANDING GEAR WHEELS ON AEROPLANES
Filed April 9, 1935  2 Sheets-Sheet 1
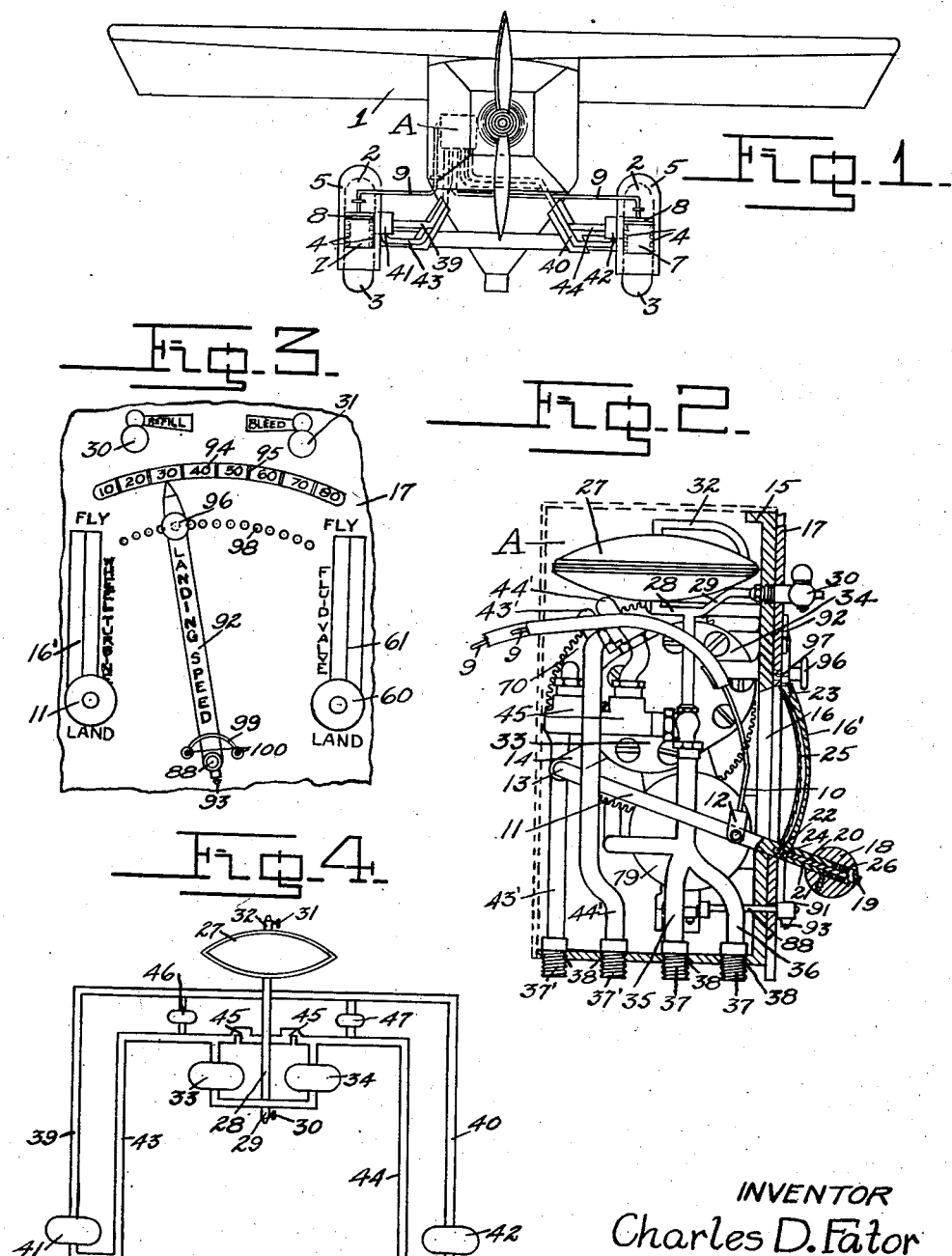
INVENTOR
Charles D. Fator
BY
ATTORNEY

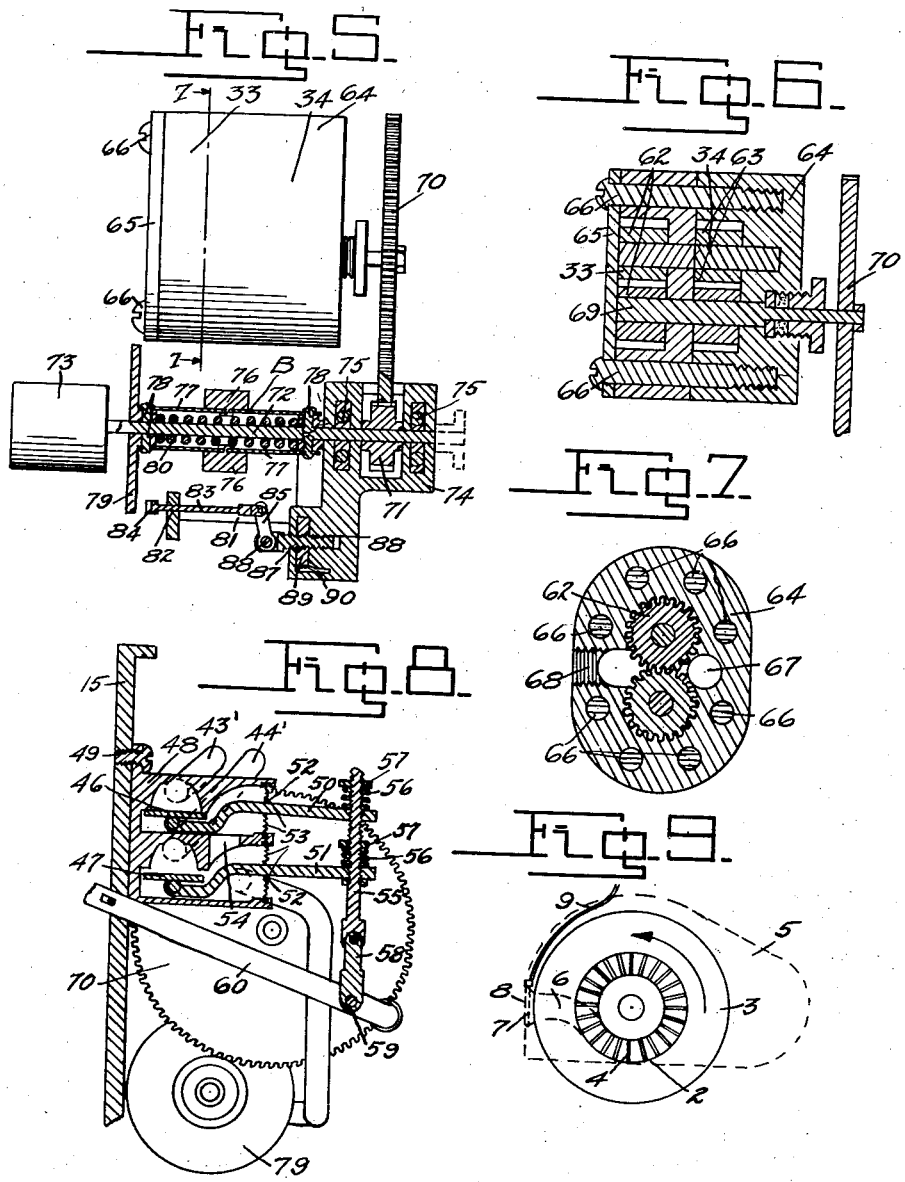

Patented Dec. 8, 1936

2,063,032

UNITED STATES PATENT OFFICE 2,063,032

SPEED CONTROL OF LANDING GEAR WHEELS ON AEROPLANES

Charles D. Fator, San Antonio, Tex.

Application April 9, 1935, Serial No. 15,453

3 Claims. (Cl. 244—2)

(Granted under the act of March 3, 1883, as amended April 30, 1928; 370 O. G. 757)

This invention described herein may be manufactured and used by or for the Government for governmental purposes, without the payment to me of any royalty thereon.

This invention relates to a new and useful improvement in aeroplanes, more particularly it is directed to the provision of means on an aeroplane for facilitating the landing thereof.

One of the objects of the invention is to provide means on an aeroplane for causing the landing wheels thereof to rotate at substantially the same speed as that of the landing speed of the plane.

Another object of the invention is to provide means on an aeroplane to lessen the chance of tilting or overturning thereof when landing, and to prolong the life of the tires provided on the landing wheels of the plane.

Other objects of the invention are to provide means of the character stated which are simple in construction and arrangement, strong, durable, efficient, compact and conveniently operated, which may be readily installed in an aeroplane already constructed as well as form component parts of a new structure, and which is comparatively inexpensive to manufacture, install and maintain.

When an aeroplane is landing with the wheels stationary the sustaining effect of the wings of the plane plus the power necessary to start the wheels thereof rotating, causes the tires on the wheels to drag for some distance on contacting the ground whereby a terrific grinding away of the thread of the tires is effected particularly when the plane is of the heavy transport type and further with the wheels of the plane stationary a condition is encountered whereby the plane ordinarily has a tendency to tilt or "nose" over which tendency is due in part to the inertia of the wheels caused by the sudden acceleration.

It is therefore the aim and purpose of this invention to provide means for facilitating the landing of an aeroplane by lessening the chance of tilting or overturning thereof and to prolong the life of the tires on the landing wheels of the plane.

With the above and other objects and advantages in view, the invention specifically consists in features of construction, arrangement and operation of parts which will hereinafter appear. For purposes of illustration the invention will be described and claimed with reference to the accompanying drawings in which like members distinguish like parts and in which:

Fig. 1 is a front elevation of an aeroplane having my invention applied thereto;

Fig. 2 is a side elevation of a speed control unit used in carrying out my invention;

Fig. 3 is a front view of a control panel for the speed control unit;

Fig. 4 is a diagrammatic view of a closed fluid circulating system used in carrying out my invention;

Fig. 5 is a horizontal sectional view of a governor mechanism adapted to control a pump unit shown in elevation;

Fig. 6 is a horizontal sectional view of the pump unit;

Fig. 7 is a cross sectional view thereof taken on line 7—7 of Fig 5;

Fig. 8 is a fragmentary vertical sectional view of a valve unit used in carrying out my invention and applied to the right hand side of the control unit, and Fig. 9 is a side elevation of the landing wheels of the plane equipped with my improved means for causing rotation thereof when landing.

In the illustrated embodiment characterizing the invention 1 denotes an aeroplane provided with a landing gear on which are revolubly mounted landing wheels 2 including the usual heavy rubber tires 3. The wheels 2 are provided with a plurality of propelling vanes 4 on the sides thereof which vanes are spaced equally to each other around the periphery of the wheels and so disposed that the air will impinge against the working surface thereof and cause the wheels to be rotated rapidly in a forward direction, as indicated by the arrow in Fig. 9 of the drawings, during the flight of the plane.

As the rotation of the landing wheels 2 is required and desired only while landing, each of the wheels 2 is covered by the pants 5 having a suction tube 6 provided therein which leads inwardly from an aperture 7 to the propelling vanes 4 and terminates closely adjacent thereto. A shutter gate 8 is connected hingedly to each of the pants 5 for controlling the opening or closing of the aperture.

The shutter gates 8 are operated by means of covered cables 9 which are connected by one end thereof to the shutter gates 8 and by their other end to one end of a rod 10 which is in turn connected to a control lever 11 at 12 of a control unit indicated generally by A and illustrated in Fig. 2 of the drawings. The lever 11 is pivoted at 13 to a projecting portion 14 provided on a frame 15 on which the control unit A is mounted and extends outwardly through an opening 16 provided in the frame 15 and through a guide slot 16' provided in one side of a panel 17 mounted on the control unit. A handle 18 having a plunger button 19 provided therein is fitted on the outer end of the lever 11. The plunger button 19 is adapted to contact with the outer end of a pin 20 which is mounted movably within a longitudinally extending slot 21 provided in the lever 11. The pin 20 is provided with a ratchet 22 on the inner end thereof which is adapted to engage in a recess 23 and 24 provided on the upper and lower ends respectively of the guide slot 16' of the panel 17 when the lever 11 is in an operative or land position as illustrated for opening the gates 8, or in an inoperative or fly position for closing the same. The ratchet 22 is also adapted to engage ratchet teeth 25 provided along the inner surface of the guide slot 16' when the lever 11 is in partial inoperative position. A compression spring 26 is provided in the handle 18 to detachably hold the ratchet 22 in the recesses 23 and 24 provided on the upper and lower ends respectively of the slot 16' as well as the ratchet teeth 25 intermediate thereof.

In order to control the speed of the wheels 2 for causing the same to rotate at substantially the landing speed of the plane, a closed fluid circulating system is provided which is diagrammatically illustrated in Fig. 4 of the drawings. Referring to Figs. 2 and 4 of the drawings, the fluid circulating system comprises a fluid reservoir 27 which is connected in the system by means of a conduit 28 which extends downwardly from the bottom of the reservoir and branches into a conduit 29 having a refill cock 30 on the outer end thereof which provides means for keeping the system charged. The reservoir 27 is made of suitable flexible material to allow for expansion and contraction of the fluid in the whole system due to temperature changes. In order to draw the air from the system particularly in the initial charging thereof with fluid, a bleed cock 31 is connected to the upper end of the reservoir 27 by means of a conduit 32. The conduit 28 leads into the outlet side of a pair of positive displacement pump units 33 and 34, the construction and operation of which will hereinafter be described; it also branches into conduits 35 and 36 which are provided with connecting members 37 on the lower ends thereof which are fitted in apertures 38 provided in the bottom of the frame 15. The members 37 provide means for connecting conduits 39 and 40 thereto, one end of said conduits 39 and 40 being connected to the members 37 and the other end thereof being connected to the inlet side of a pair of gear type displacement pump units 41 and 42 which are mounted on the axle assembly for the wheels 2 and in driving connection with the wheels by being geared to the left and right wheels respectively of the aeroplane. The pump units 41 and 42 as will hereinafter appear, provide a braking action on the wheels 2 for controlling the rotational speed thereof. The fluid in the system is conducted from the outlet side of the brake pump units 41 and 42 to the inlet side of the fluid displacement pump units 33 and 34 by means of conduits 43 and 44 respectively, which connect with connecting members 37' provided on the lower ends of conduits 43' and 44' which lead into inlet side of the pump units 33 and 34. A freely operating mono-directional type of check valve 45 is provided in the system for each of the displacement pump units 33 and 34, and combination by-pass, check and pressure relief valves 46 and 47 are provided for the wheel brake pump units 41 and 42 respectively.

Referring to Fig. 8 of the drawings the combination by-pass, check and pressure relief valves 46 and 47 are combined in a single unit comprising a body portion 48 which is secured to the frame 15 of the control unit by a screw 49 or the like. The valves 46 and 47 are operated by levers 50 and 51 respectively which are pivoted at 52 to diaphragms 53 which are made of suitable material such as metal and brased to the body portion 48, thereby serving as a positive fluid seal for the fluid passing through the valve body. The passageway 54 provides means for connecting the exhaust side of the valves 46 and 47 to the conduit 28. The outer ends of the levers 50 and 51 threadably engage the upper screw-threaded end of a shaft 55 and are held in spaced relation to each other by springs 56 and adjusting nuts 57. The shaft 55 is pivoted at the lower end thereof to a link 58 which is in turn pivoted at 59 to a fluid valve control lever 60 which operates in a guide slot 61 provided in the panel 17 to control the valves 46 and 47. The valves 46 and 47 are operated simultaneously by the valve control lever 60 and in the present illustration the valve 46 is shown in a closed position as both valves 46 and 47 would be when the lever is in the land position as illustrated in Fig. 3 of the drawings. In this closed position the valves act as high pressure relief valves and any excess pressure built up in either the conduits 43 and 44 serves to unseat either valve 46 and 47 respectively to let the fluid escape back into the conduits 39 and 40. The valve 47 is illustrated as being in an open position as both valves would be with the fluid valve control lever 60 in a fly position and in this open position the valves 46 and 47 act as by-pass valves allowing full passage of the fluid for the conduits 43 and 44 to conduits 39 and 40 without any undue braking of the landing wheels if they are rotating.

The fluid displacement pump units 33 and 34 are formed into a single unit as illustrated in Figs. 5, 6 and 7 of the drawings and each comprises a pair of gears 62 and 63 which are enclosed within a housing 64 having a cover 65 provided thereon which is held in place by means of screws 66. An outlet passageway 67 is provided in the housing 64 which leads from the delivery side of the pump 33 to the pressure or delivery side of the pump 34. The inlet side 68 of the displacement pump units 33 and 34 is connected to the outlet side of the brake pump units 41 and 42.

The displacement pump units 33 and 34 are driven from and by a shaft 69 through a gear wheel 70 which is in mesh with a driving pinion 71 of a governor mechanism for controlling the speed of the pump units and thus the amount of fluid displaced thereby, as illustrated in Fig. 5 of the drawings. The driving pinion 71 is mounted on a shaft 72 which is driven by a suitable motor 73 which in the present instance is proposed to be started when the fluid valve control lever 60 is in the land position and stopped when the lever is in the fly position. The driving pinion 71 is partially enclosed within a support 74 having anti-friction ball bearings 75 provided therein on which one end of the shaft 72 is adapted to be rotated. The governor mechanism includes a centrifugal governor indicated generally by B which is mounted on the shaft 72 and comprises weights 76 secured to spring arms 77 which are connected at one end by brads 78 or the like to the shaft 72 and support 74 and at the other ends thereof to a braking wheel 79 movably mounted on the shaft 72. A compression spring 80 is provided on the shaft 72 for holding the braking wheel 79 in an outward position. The support 74 is provided with an outwardly projecting portion 81 on the lower end thereof containing an aperture 82 in which a rod 83 is mounted for holding the brake wheel 79 in a predetermined position on the shaft and thereby causes the governor to operate at a particular speed for controlling the pumps 33 and 34. The outer end of the rod 83 is provided with a brake shoe 84 adapted to contact with the wheel 79 and the inner end thereof is pivoted to one end of a lever arm 85 which is in turn fixably secured to a shaft 86 which is pivotally secured by one end to the outer end of a screw threaded bolt 87. The bolt 87 is connected threadably in a recess 88 provided in the support 74 and has an adjusting nut 89 mounted on the inner end thereof for taking up wear of the brake shoe. In order to prevent the nut 89 from turning due to vibration or the like a lock spring 90 is provided on the support 74. The shaft 88 which is fixably secured to the lever arm 85 and pivoted to the bolt 87 at one end extends out through an aperture 91 provided in the lower end of the frame 15 and panel 17 and engages the lower end of a control pointer 92 which is fixably secured thereto by a screw 93 as illustrated in Figs. 2 and 3 of the drawings. A suitable index chart 94 including a color division 95 for indicating the normal landing speed of the plane is provided on the upper end of the panel 17 to which the pointer 92 is adapted to be set for various speeds of the plane. The pointer 92 is moved to the various points on the index speed chart 94 by means of a finger grip 96 having a pin 97 provided on the inner end thereof which is adapted to engage movably in suitable spaced openings 98 provided in the panel 17 to hold the pointer 92 in a fixed position thereon. A guide member 99 which is secured to the panel 17 by screws 100 may be provided for guiding the pointer 92.

In the operation of the invention assuming that a pilot is about to land the plane 1, the landing speed pointer 92 is set on the speed index 94 to the desired speed at which the landing wheels 2 should rotate, which moves the rod 83 of the control mechanism to a predetermined position and thus prevents the governor from driving the pump units 33 and 34 more than desired by the brake wheel 79 contacting with the brake shoe on the outer end of the rod. The fluid control valve lever 60 is then moved to the land position as indicated on Fig. 3 of the drawings, which serves to close the valves 50 and 51 to make them act as high-pressure relief and check-valves. The lever 60 may be so connected to the drive motor 73 to start the same, in which case upon starting the motor 73 the displacement pump units 33 and 34 are driven at the proper speed as set by the speed pointer 92 which controls the action of the governor mechanism. The pump units 33 and 34 immediately reach the desired speed and circulate the fluid in the system through the check valves 45 with little or no power losses. The lever 11 is then moved to the land position thereby opening the shutter gates 8 as illustrated in Figs. 1 and 3 of the drawings, which allows a high velocity air stream to pass through the suction tube 6 and impinge against the propelling vanes 4 provided on the wheels 2 thereby causing rotation of the wheels. When the lever 11 is at the fly position the shutter gates 8 are closed and no air-blast strikes the vanes 4 which are otherwise protected by the pants 5. As the wheels 2 rapidly gain speed the brake pump units 41 and 42 which are geared to the wheels 2 pump fluid from the conduits 39 and 40 respectively into the conduits 43 and 44 and subsequently to the conduits 35 and 36 to the displacement pump units 33 and 34 until no more fluid is passed through the check valves 45. The moment the brake pump units 41 and 42 displace the same amount of fluid in the system as does the displacement pump units 33 and 34, any tendency to increase the displacement of the brake pump units 41 and 42 causes a pressure to be built up in the conduits 43 and 44, which causes the check valves 45 to close. Whenever the brake pump units 41 and 42 begin to displace more fluid than the pump units 33 and 34, the built up pressure in the conduits 43 and 44 causes a suitable and proportionate braking effect to be applied to the wheels 2, thereby preventing the wheels from rotating faster than the speed at which the pump units 41 and 42 will displace a volume of fluid equal to that being displaced by the pump units 33 and 34. Thus any excess power applied to the wheels 2 by the propelling vanes 4 is dissipated and the wheels are prevented from rotating in excess of the speed at which the pacemaker control pointer 92 is set.

For taking off and taxying on the ground when no braking effect is desired on the wheels, the fluid valve lever 60 is moved to the fly position, which causes the valves 46 and 47 to act as by-pass valves allowing the fluid in the system free passage through the conduits 39 and 43 and 40 and 44 respectively.

It will thus be seen that I have provided highly novel and efficient means which are well adapted for all the purposes indicated. Even though I have herein described my invention as comprising certain details of construction, it is nevertheless to be understood that many changes may be made therein without departing from the spirit or scope of my invention.

Having described my invention, what I claim as new and wish to secure by Letters Patent is:

1. In an aeroplane including a landing gear having landing wheels mounted revolubly thereon, means for rotating said landing wheels in a forward direction during the flight of the aeroplane, means for substantially synchronizing the rotational speed of said landing wheels to that of the landing speed of the plane, said last mentioned means comprising a covering for said landing wheels, an exposure aperture provided in said covering, means operable for opening and closing said aperture, a closed fluid circulating system including a fluid displacement pump in driving connection with each of said wheels and providing a braking action thereon; a motor, fluid displacement pumps driven by said motor and adapted to control the braking action of said first mentioned pumps, conduits connecting said first mentioned pumps to said last mentioned pumps, a fluid circulated by said pumps, check and combination by-pass check and pressure-relief valves in said conduits, said valves being responsive to the pressure within said system and means for controlling the speed of said displacement pumps driven by said motor.

2. In an aeroplane including a landing gear having landing wheels mounted revolubly thereon; means for rotating said landing wheels in a forward direction during the flight of the aeroplane, means for substantially synchronizing the rotational speed of said landing wheels to that of the landing speed of the wheels, said last mentioned means comprising a covering for said landing wheels, an exposure aperture provided in said covering, means operable for opening and closing said aperture, a closed fluid circulating system including a fluid displacement pump in driving connection with each of said wheels and providing a braking action thereon; a motor, fluid displacement pumps driven by said motor and adapted to control the braking action of said first mentioned pumps, conduits connecting said first mentioned pumps to said last mentioned pumps, a fluid circulated by said pumps, check and combination by-pass, check and pressure-relief valves in said conduits, said valves being responsive to the pressure within said system, and means for controlling the speed of said displacement pumps driven by said motor, means connected in said conduits for taking up the expansion and contraction of the fluid in the system and means connected to said last mentioned means for keeping the system charged and drawing air therefrom.

3. In an aeroplane including a landing gear having landing wheels mounted revolubly thereon, means for rotating said landing wheels in a forward direction during the flight of the aeroplane, means for enclosing said landing wheels, means operable for partially exposing said landing wheels, a control unit, a panel including guide slots and a speed index chart provided thereon, a control lever pivotably connected to said control unit and adapted to work in one of said slots for operating said exposure means, a closed fluid circulating system including a fluid displacement pump in driving connection with each of said wheels and providing a braking action thereon; a motor, fluid displacement pumps driven by said motor and adapted to control the braking action of said first mentioned pumps, conduits connecting said first mentioned pumps to said last mentioned pumps, a fluid circulated by said pumps, check and combination by-pass, check and pressure relief valves in said conduits, said valves being responsive to the pressure within said system, means for controlling the speed of said displacement pumps driven by said motor including a pointer adapted to be moved to various points on said speed index chart, a fluid valve lever adapted to work in the other of said slots in said panel for controlling the action of said combination by-pass check and pressure relief valves; means connected on said system for taking up the expansion and contraction of the fluid therein and means mounted in said panel and connected to said last mentioned means for draining air from the system and keeping said system charged.

CHARLES D. FATOR.